(12) United States Patent
Margolin et al.

(10) Patent No.: US 11,949,740 B2
(45) Date of Patent: Apr. 2, 2024

(54) REMOTE DIRECT MEMORY ACCESS WITH OFFSET VALUES

(71) Applicant: HUAWEI TECHNOLOGIES CO., LTD., Guangdong (CN)

(72) Inventors: Alex Margolin, Hod Hasharon (IL); Ben-Shahar Belkar, Hod Hasharon (IL); Ronen Hyatt, Hod Hasharon (IL); Danny Volkind, Hod Hasharon (IL); Lior Khermosh, Hod Hasharon (IL); Tal Mizrahi, Hod Hasharon (IL); Guy Shattah, Hod Hasharon (IL)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/983,146

(22) Filed: Nov. 8, 2022

(65) Prior Publication Data
US 2023/0061873 A1 Mar. 2, 2023

Related U.S. Application Data

(63) Continuation of application No. PCT/EP2020/062877, filed on May 8, 2020.

(51) Int. Cl.
*H04L 67/1097* (2022.01)

(52) U.S. Cl.
CPC .............................. *H04L 67/1097* (2013.01)

(58) Field of Classification Search
None
See application file for complete search history.

(56) References Cited

U.S. PATENT DOCUMENTS

| 8,655,974 | B2 | 2/2014 | Frey et al. |
| 9,742,855 | B2 | 8/2017 | Shuler et al. |
| 10,296,451 | B1* | 5/2019 | Schneider ............... G06F 3/061 |
| 10,437,481 | B2* | 10/2019 | Tan ......................... G06F 3/0688 |
| 10,977,193 | B2* | 4/2021 | Kimura .................... H04L 67/10 |
| 11,593,107 | B2* | 2/2023 | Raisch ..................... G06F 9/546 |

(Continued)

FOREIGN PATENT DOCUMENTS

| EP | 3217292 A1 | 9/2017 |
| WO | WO-2019118255 A1 * | 6/2019 ....... G06F 15/17331 |

(Continued)

OTHER PUBLICATIONS

Watanabe et al., "Martini: A Network Interface Controller Chip for High-Performance Computing with Distributed PCs," IEEE Transactions On Parallel and Distributed Systems, vol. 18, No. 9, Sep. 2007, 14 pages.

(Continued)

*Primary Examiner* — Shean Tokuta
(74) *Attorney, Agent, or Firm* — Fish & Richardson P.C.

(57) ABSTRACT

The present disclosure provides devices and methods relating to remote direct memory access (RDMA). In one implementation, a target device of the RDMA operation is configured to receive a packet including a first destination address and a destination key, obtain one or more offset values, and obtain a second destination address based on the first destination address, the destination key, and the one or more offset values. Further, the target device is configured to initiate the RDMA operation on a memory based on the second destination address.

20 Claims, 6 Drawing Sheets

(56) References Cited

U.S. PATENT DOCUMENTS

| | | | | |
|---|---|---|---|---|
| 2006/0136697 | A1* | 6/2006 | Tsao | G06F 12/1027 |
| | | | | 711/E12.067 |
| 2006/0149919 | A1* | 7/2006 | Arizpe | G06F 12/1009 |
| | | | | 710/22 |
| 2006/0236063 | A1* | 10/2006 | Hausauer | G06F 12/1081 |
| | | | | 711/170 |
| 2007/0162641 | A1 | 7/2007 | Oztaskin et al. | |
| 2008/0059600 | A1* | 3/2008 | Bestler | G06F 12/1081 |
| | | | | 709/212 |
| 2008/0091915 | A1* | 4/2008 | Moertl | G06F 12/1081 |
| | | | | 710/22 |
| 2008/0301254 | A1* | 12/2008 | Bestler | H04L 69/166 |
| | | | | 709/212 |
| 2009/0150641 | A1* | 6/2009 | Flynn | G06F 12/1081 |
| | | | | 711/202 |
| 2010/0049821 | A1* | 2/2010 | Oved | G06F 9/542 |
| | | | | 709/212 |
| 2012/0005671 | A1* | 1/2012 | Baratakke | G06F 9/45541 |
| | | | | 718/1 |
| 2015/0178242 | A1* | 6/2015 | Snyder, II | G06F 9/45533 |
| | | | | 713/150 |
| 2016/0342342 | A1* | 11/2016 | Kan | G06F 12/0802 |
| 2017/0155717 | A1* | 6/2017 | Tamir | H04L 69/12 |
| 2018/0188974 | A1* | 7/2018 | Cayton | G06F 3/0655 |
| 2018/0189204 | A1* | 7/2018 | Sternberg | G06F 13/42 |
| 2018/0253386 | A1* | 9/2018 | Qiu | G06F 13/1668 |
| 2019/0018794 | A1* | 1/2019 | Beard | G06F 9/30123 |
| 2019/0102287 | A1* | 4/2019 | Cayton | H04L 67/1097 |
| 2019/0102315 | A1* | 4/2019 | Guim Bernat | G06F 12/0223 |
| 2019/0188181 | A1* | 6/2019 | Degani | G06F 15/17331 |
| 2019/0324917 | A1* | 10/2019 | Cui | G06F 12/0284 |
| 2021/0117235 | A1* | 4/2021 | Kronrod | G06F 9/526 |
| 2021/0342071 | A1* | 11/2021 | Puhov | G06F 3/064 |
| 2023/0011387 | A1* | 1/2023 | Qiu | G06F 3/0655 |
| 2023/0061873 | A1* | 3/2023 | Margolin | G06F 12/1081 |
| 2023/0090973 | A1* | 3/2023 | Ray | G06F 9/30047 |
| | | | | 711/137 |

FOREIGN PATENT DOCUMENTS

| | | | | |
|---|---|---|---|---|
| WO | WO-2019244656 A1 | * | 12/2019 | |
| WO | WO-2020155417 A1 | * | 8/2020 | G06F 3/0604 |
| WO | WO-2021223880 A1 | * | 11/2021 | G06F 12/1081 |
| WO | WO-2021239228 A1 | * | 12/2021 | G06F 12/1009 |
| WO | WO-2021239230 A1 | * | 12/2021 | G06F 12/1009 |

OTHER PUBLICATIONS

Taleb et al., "Tailwind: Fast and Atomic RDMA-based Replication," 2018 USENIX Annual Technical Conference (USENIX ATC'18), Jul. 11-13, 2018, Boston, MA, USA, 14 pages.

Kalia et al., "Using RDMA Efficiently for Key-Value Services," In Proceedings of the 2014 ACM Conference on SIGCOMM, Aug. 17-22, 2014, 15 pages.

International Search Report and Written Opinion in International Appln. No. PCT/EP2020/062877, dated Feb. 2, 2021, 11 pages.

* cited by examiner

REMOTE DIRECT MEMORY ACCESS WITH OFFSET VALUES

CROSS-REFERENCE TO RELATED APPLICATIONS

This application is a continuation of International Application No. PCT/EP2020/062877, filed on May 8, 2020, the disclosure of which is hereby incorporated by reference in its entirety.

TECHNICAL FIELD

The present disclosure relates to Remote Direct Memory Access (RDMA). The present disclosure provides devices and corresponding methods for RDMA, which may initiate one or more RDMA operations in a memory, in particular a memory of a remote host. In particular, the present disclosure is concerned with enabling zero-copy on a target.

BACKGROUND

RDMA is a method for communication between hosts in a computer network. It typically requires special hardware support in at least one Network Interface Card (NIC). Most conventional devices and methods conform to the widely accepted "Infiniband" standard by the Infiniband Trade Association (IBTA), which covers hardware specifications, protocol formats, and how applications may use them. Notably, some NIC vendors extend their implementations with additional, non-standard functionality.

RDMA is, for example, widely used in data centers and clusters, particularly for low-latency and high-bandwidth networking. RDMA operations include the following types (wherein (1) indicates a "one-sided operation", and (2) indicates a "two-sided operation"):

1. RDMA Read (1): Given a memory location, this RDMA operation reads at the memory location from the memory of a remote host.
2. RDMA Write (1): Given data and a memory location, this RDMA operation writes the data at the memory location to the memory of a remote host.
3. RDMA Send (2): Given data, this RDMA operation writes the data to a next available buffer in a queue of a remote host.
4. RDMA Atomic (0): Given data and a memory location, this RDMA operation updates the memory of a remote host with the data at the memory location (with atomicity, meaning that it may be guaranteed to happen without interruptions).

As illustrated exemplarily in FIG. 6, a conventional device for RDMA performs any of the above-described operations based on a packet including at least the memory location (e.g., a virtual or physical address of the memory). FIG. 6 shows exemplarily a conventional target device 600 (also referred to as physical target host) including a virtual memory 607, a NIC 609, and a (physical) memory 605, wherein the target device 600 executes an RDMA write operation in the memory 605. The RDMA operation is based on a RDMA packet 601 including a destination virtual address (VA) 602, a memory key 603, the data 604 to be written, and a data length 606 of the data 604. The packet 601 is provided by an initiator device (not shown) of the RDMA operation. Conventionally, the target device 600 does not control the location of the destination memory defined by the destination VA 602.

In particular, when the packet 601 arrives, the following steps may take place at the target device 600:
1. According to the memory key 603 contained in the packet 601:
    1.1. Check memory region access permissions.
    1.2. Based on the destination VA 602 and data length 606 in the packet 601, check if the RDMA operation is within the memory's 605 bounds.
    1.3. Translate the destination VA 603 to a destination PA.
2. According to an opcode 608 in the packet 601, which indicates the RDMA operation type:
    2.1. RDMA Write: write the message payload (the data 604) to the calculated destination physical address (PA).
    2.2. RDMA Read: read data (of a given length) from the calculated destination PA, and send it back to the initiator device.
    2.3. RDMA Atomic: apply one of several standard atomic operations at the calculated destination PA.

A problem with such a conventional RDMA operation, and accordingly of the conventional devices and methods suitable for RDMA, is that an efficient communication with zero-copy on the target device is hard to achieve. In particular, zero-copy on the target is harder than on the initiator side, since it is hard for the target device to control/anticipate incoming packets/data and sizes thereof. Notably, zero-copy denotes a method, wherein each message (e.g. the packet including the data) is passed only once (a) from the initiator's region to its NIC (zero-copy send) and (b) from the target's NIC to the destination region (zero-copy receive). Zero-copy is desired, since it reduces the communication latency.

A conventional custom, ad hoc approach, such as "tag-matching" does not completely solve the above problem. In this approach, the target device informs the NIC of expected messages (and regions for them). Incoming messages are then identified by some fixed-size prefix ("tag"), against a list of expected tags. If the incoming message matches a tag, the respective memory region (zero-copy) is used. If it does not match, it is written to some temporary buffer pool (to be copied later, so not zero-copy). Disadvantages of this approach are that it is not "transparent" to the application, since it requires code modification to use (specify tags). Further, it is slower than the alternatives, due to costly software (SW)—hardware (HW) synchronization. In addition, it requires non-standard hardware.

SUMMARY

In view of the above-mentioned problems and disadvantages, embodiments of the present invention aim to improve the conventional devices, methods and approaches. An objective is to provide devices and methods for RDMA, which enable efficient zero-copy on the target.

The objective is achieved by the embodiments of the invention as described in the enclosed independent claims. Advantageous implementations of the embodiments of the invention are further defined in the dependent claims.

Embodiments of the invention are based on a combination of any of the above-described RDMA operations (RDMA read/write/atomic operation) with atomic access to one or more offset values (wherein access may include incrementing the one or more offset values according to a size of a RDMA read/write operation, but other types of access are possible). The combination may be "atomic", meaning that it may be guaranteed to happen without interruptions (which is beneficial for cases of multiple concurrent operations).

A first aspect of this disclosure provides a device for RDMA, wherein for executing an RDMA operation on a memory, the device is configured to: receive a packet including a first destination address and a destination key: obtain one or more offset values; obtain a second destination address based on the first destination address, the destination key, and the one or more offset values, and initiate the RDMA operation on the memory based on the second destination address.

Thus, a new RDMA operation, particularly a RDMA operation with offset is introduced. The device of the first aspect may be the target device of that RDMA operation. This new RDMA operation enables zero-copy on the target as discussed above.

In an implementation form of the first aspect, the packet further comprises one or more first offset addresses and one or more offset keys, and the device is configured to obtain the one or more offset values based on the one or more first offset addresses and the one or more offset keys.

In an implementation form of the first aspect, the device is further configured to initiate a modification of at least one offset value, after the RDMA operation is performed on the memory.

In an implementation form of the first aspect, the modification of the at least one offset value comprises an increase or a decrease of the at least one offset value.

In an implementation form of the first aspect, the packet further comprises a data length, and the device is configured to initiate the modification of the at least one offset value based on the data length.

In an implementation form of the first aspect, the first destination address is a virtual address of a virtual memory of the device, and the second destination address is a physical address of the memory, and the device is configured to translate the first destination address into the second destination address based on a base virtual address, a base physical address of the memory, and the one or more offset values.

In an implementation form of the first aspect, the device is further configured to obtain one or more second offset addresses based on the one or more first offset addresses; and obtain the one or more offset values using the one or more second offset addresses.

In an implementation form of the first aspect, the one or more first offset addresses are virtual addresses of a virtual memory of the device, and the one or more second offset addresses are physical addresses of the memory, and the device is configured to translate the one or more first offset addresses into the one or more second offset addresses based on one or more offset base virtual addresses and an offset base physical address of the memory.

In an implementation form of the first aspect, the device is configured to obtain the one or more offset base virtual addresses and the offset base physical address based on the one or more offset keys.

In an implementation form of the first aspect, the one or more offset values are stored in the device, and/or the one or more offset values are stored on the memory, wherein the device comprises the memory, or the memory is a remote memory the device is configured to communicate with.

For the device of the first aspect, the "remote memory" is a memory of a remote host or device, i.e., a memory that is neither comprised by nor located at the device of the first aspect. For instance, it may be the memory of a third device.

A second aspect of this disclosure provides a device for RDMA, wherein for initiating an RDMA operation on a remote memory, the device is configured to provide a packet including a destination address, a destination key, one or more offset addresses, and one or more offset keys, to another device, wherein the destination address indicates a location for the RDMA operation on the remote memory, and wherein the one or more offset addresses indicate a location of one or more offset values at the other device or on the remote memory.

Thus, a new RDMA operation, particularly a RDMA operation with offset is introduced. The device of the second aspect may be the initiator device of that RDMA operation. This new RDMA operation enables zero-copy on the target as discussed above.

For the device of the second aspect, the "remote memory" is a memory of a remote host or device, i.e., a memory that is neither comprised by nor located at the device of the second aspect. For instance, it may be a memory comprised by or located at the device of the first aspect.

In an implementation form of the second aspect, the RDMA operation is an RDMA write operation, or an RDMA read operation, or an RDMA atomic operation.

The RDMA operation may be determined or indicated by an opcode in the packet.

A third aspect of this disclosure provides a method for RDMA, wherein for executing an RDMA operation on a memory, the method comprises: receiving a packet including a first destination address and a destination key; obtaining one or more offset values; obtaining a second destination address based on the first destination address and the one or more offset values, and initiating the RDMA operation on the memory based on the second destination address In an implementation form of the third aspect, the packet further comprises one or more first offset addresses and one or more offset keys, and the method further comprises obtaining the one or more offset values based on the one or more first offset addresses and the one or more offset keys.

In an implementation form of the third aspect, the method further comprises initiating a modification of at least one offset value, after the RDMA operation is performed on the memory.

In an implementation form of the third aspect, the modification of the at least one offset value comprises an increase or a decrease of the at least one offset value.

In an implementation form of the third aspect, the packet further comprises a data length, and the method further comprises initiating the modification of the at least one offset value based on the data length.

In an implementation form of the third aspect, the first destination address is a virtual address of a virtual memory, and the second destination address is a physical address of the memory, and the method further comprises translating the first destination address into the second destination address based on a base virtual address, a base physical address of the memory, and the one or more offset values.

In an implementation form of the third aspect, the method further comprises obtaining one or more second offset addresses based on the one or more first offset addresses, and obtaining the one or more offset values using the one or more second offset addresses.

In an implementation form of the third aspect, the one or more first offset addresses are virtual addresses of a virtual memory, and the one or more second offset addresses are physical addresses of the memory, and the method further comprises translating the one or more first offset addresses into the one or more second offset addresses based on one or more offset base virtual addresses and an offset base physical address of the memory.

In an implementation form of the third aspect, the method further comprises obtaining the one or more offset base virtual addresses and the offset base physical address based on the one or more offset keys.

In an implementation form of the third aspect, the one or more offset values are stored in the device, and/or the one or more offset values are stored on the memory, wherein the device comprises the memory, or the memory is a remote memory the device is configured to communicate with.

The method of the third aspect provides the same advantages as the device of the first aspect.

A fourth aspect of this disclosure provides a method for RDMA, wherein for initiating an RDMA operation on a remote memory, the method comprises providing a packet including a destination address, a destination key, one or more offset addresses, and one or more offset keys, wherein the destination address indicates a location for the RDMA operation on the remote memory, and wherein the one or more offset addresses indicate a location of one or more offset values at a device maintaining the one or more offset values or on the remote memory.

In an implementation form of the fourth aspect, the RDMA operation is an RDMA write operation, or an RDMA read operation, or an RDMA atomic operation.

The method of the fourth aspect provides the same advantages as the device of the second aspect.

A fifth aspect of this disclosure provides a computer program comprising a program code for performing the method according to the third aspect or fourth aspect or any implementation form thereof, when executed on a computer.

A sixth aspect of this disclosure provides a non-transitory storage medium storing executable program code, which, when executed by a processor, causes the method according to the third aspect or fourth aspect or any of their implementation forms to be performed.

In summary, the aspects and implementation forms (embodiments of the invention) define a new class of RDMA operations (RDMA operations with offset), all of which employ one or more offset values, extending the list of the currently available RDMA operation types, which do not employ such offset values (e.g. RDMA Write is extended to RDMA Write-with-offset). Adding the one or more offset values at the side of the target device, to be used and updated during/after any new RDMA operation, solves the aforementioned issues. As each packet arrives, the actual memory destination in the target memory depends on the value of said one or more offset values (which are, e.g., maintained in an offset register at the target device or memory). For example, by adding the data length of the data to that offset register, the next data (using the same offset register, now containing the updated offset value) may be written right after the previous data in the memory. The new mechanism for calculating the destination memory for these RDMA operations can be used in applications to allow zero-copy on the target, without any per-data software actions (it may only need one-time establishment).

It has to be noted that all devices, elements, units and means described in the present application could be implemented in software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF DRAWINGS

The above described aspects and implementation forms (embodiments of the invention) will be explained in the following description of specific embodiments in relation to the enclosed drawings, in which.

DETAILED DESCRIPTION OF EMBODIMENTS

Figure 1:
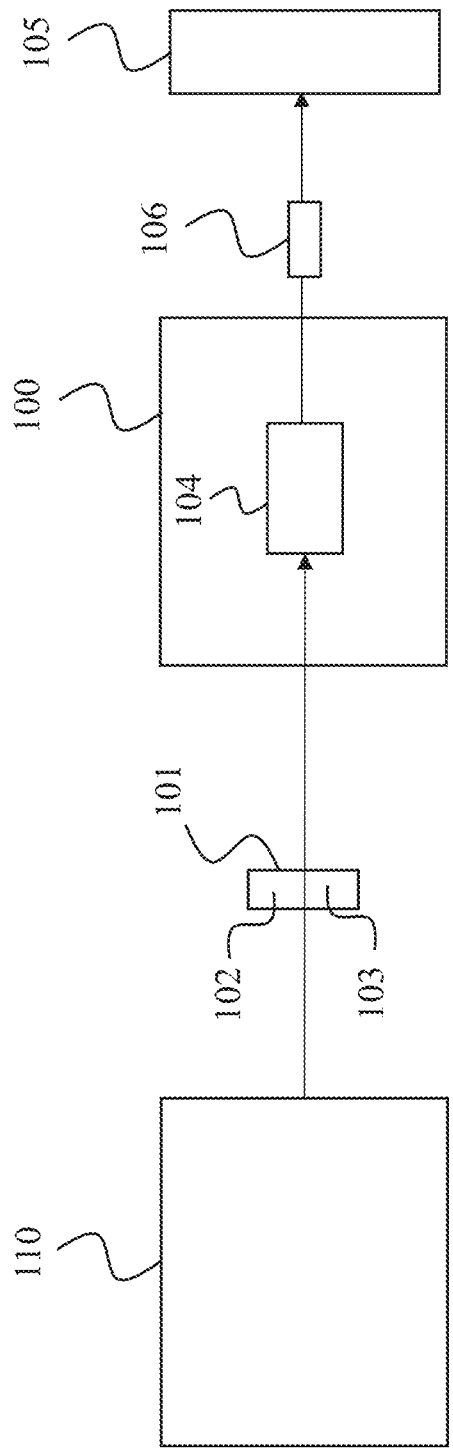
FIG. 1 shows devices according to embodiments of the invention interacting with each other.

FIG. 1 shows a device 100 and a device 110, according to embodiments of the invention. The devices 100 and 110 are both suitable for RDMA. In particular, the device 100 is a target device 100 of an RDMA operation, i.e. for executing the RDMA operation, and the device 110 is an initiator device 110 of the RDMA operation. i.e. for initiating the RDMA operation.

The target device 100 may execute the RDMA operation in a (physical) memory 105. The target device 100 may comprise the memory 105. However, the memory 105 may also be a "remote memory" for the target device 100, e.g. it may belong to a further device. For the initiator device 110, the memory 105 is in any case a "remote memory", whether it is comprised by the target device 100 or by a further device. In the following, reference is made only to the "memory 105".

For executing the RDMA operation in the memory 105, the target device 100 is configured to receive a packet 101, wherein the packet 101 includes at least a first destination address 102 and a destination key 103. The target device 100 may receive the packet 101 from the initiator device 110. Thus, the initiator device 110 is configured to provide the packet 101, in order to initiate the RDMA operation in the memory 105. The destination address 102 indicates a location for the RDMA operation in the memory 105.

Further, the target device 100 is configured to obtain one or more offset values 104. There are different ways to obtain the one or more offset values 104, which are described further below. Then, the target device 100 is configured to obtain a second destination address 106 based on the first destination address 102, based on the destination key 103, and based on the one or more offset values 104. Then, the target device 100 is configured to initiate and/or execute the RDMA operation in the memory 105 based on the second destination address 106. The RDMA operation may thereby be an RDMA Write operation, or an RDMA Read operation, or an RDMA Atomic operation, i.e., more precisely it may be an RDMA Write-with-offset operation, or an RDMA Read-with-offset operation, or an RDMA Atomic-with-offset operation.

The target device 100 and/or the initiator device 110 may comprise a processor or processing circuitry (not shown) configured to perform, conduct or initiate the various operations of the target device 100 and/or the initiator device 110 described herein. The processing circuitry may comprise hardware and/or the processing circuitry may be controlled by software. The hardware may comprise analog circuitry or digital circuitry, or both analog and digital circuitry. The digital circuitry may comprise components such as application-specific integrated circuits (ASICs), field-programmable arrays (FPGAs), digital signal processors (DSPs), or multi-purpose processors.

The target device 100 and/or the initiator device 110 may further comprise memory circuitry, which stores one or more instruction(s) that can be executed by the processor or by the processing circuitry, in particular under control of the software. For instance, the memory circuitry may comprise a non-transitory storage medium storing executable software code which, when executed by the processor or the processing circuitry, causes the various operations of the target device 100 and/or the initiator device 110 to be performed.

In one embodiment, the processing circuitry comprises one or more processors and a non-transitory memory connected to the one or more processors. The non-transitory memory may carry executable program code which, when executed by the one or more processors, causes the target device 100 and/or the initiator device 110 to perform, conduct or initiate the operations or methods described herein.

Figure 2:
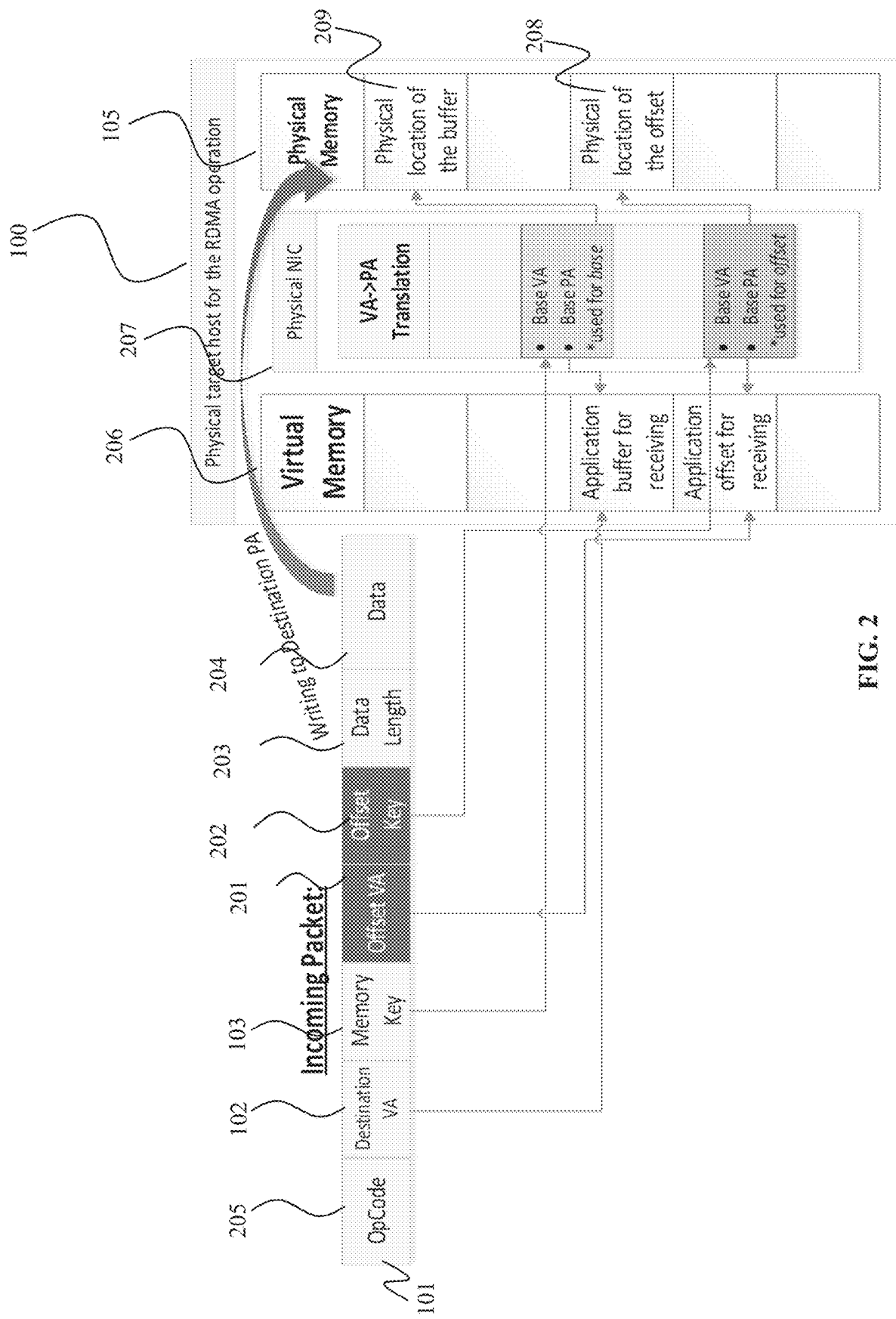
FIG. 2 shows an explicit RDMA Write-with-offset operation.

FIG. 2 shows an example of an "explicit" RDMA Write-with-offset operation (wherein the type of the RDMA operation may be determined or indicated by an opcode 205 in the packet 101), which may be executed by the target device 100 (also referred to as "Physical target host for the RDMA operation") and initiated by the initiator device 110, respectively. In particular, the packet 101 is shown as provided by the initiator device 110 (not shown). Based on this packet 101, the target device 100 can execute the RDMA Write-with-offset operation in the memory 105. In this example, the memory 105 is comprised by the target device 100. Further, in this example, the target device 100 also comprises a virtual memory 206, and a NIC 207. The RDMA operation is referred to as "explicit", because the one or more offset values 104 to be used in this RDMA operation are indicated (explicitly) by the packet 101.

In particular, the packet 101 includes the first destination address 102 and the destination key 103. In the example of FIG. 2, the destination key 103 is a memory key of the memory 105, and the first destination address 102 is a destination VA. The destination VA 102 is an address of the virtual memory 206 and is associated with a buffer of the target device 100. The packet 101 further comprises a first offset address 201 and an offset key 202. In the example of FIG. 2, the first offset address 201 is an offset VA. The offset VA 201 is an address of the virtual memory 206 and is associated with a location of storage of the offset value 104. The offset VA 201 may indicate a physical location 208 of the offset value 104 in the memory 105 of the target device 100 (or alternatively on a remote memory of a further device that the target device 100 is configured to communicate with (alternative not shown)).

The packet 101 may further comprise data 204 (to be written). The packet 101 would not comprise such data 204 if the RDMA operation was a RDMA Read-with-offset operation. The packet 101 may further comprise a data length 203 of the data 204. Finally, the packet 101 may further comprise the opcode 205, which determines or indicates the RDMA operation to be executed.

The data 204 may particularly be written by the target device 100 to a physical location 209 in the memory 105 (e.g., a physical location 209 in a certain memory region of the memory 105, wherein the memory region may be indicated by the memory key 103). The physical location 209 corresponds to the second destination address 106 (in the example of FIG. 2, the second destination address 106 is a destination physical address (PA) of the memory 105), which may be derived by the target device 100 based on the destination VA 102—as provided by the initiator device 110—and further based on the offset value 104. That is, the data 204 may be written to the destination PA 106. In particular, the data 204 may thereby be first written using the destination VA 102 of the virtual memory 206, i.e. into the buffer of the target device 100, and then by the target device 100 into the memory 105 using the destination PA 106, i.e., to the physical location 209.

Accordingly, both sides, i.e. the initiator device 110 and the target device 100, can contribute to generating the second destination address 106. In particular, by adding the offset value 14 on the side of the target device 100, the target device 100 is allowed to control the write destination, and thus the operation nature is changed from one-sided (control only at the initiator device 110) to two-sided (control at both devices).

In the example of FIG. 2, the destination PA 106 of the memory 105 may be obtained by the target device 100 by translating the destination VA 102 into the destination PA 106 based on a base VA, a base PA of the memory 105, and based on the one or more offset values 104.

The base VA and/or base PA may be known to the target device 100, or may be obtained or received by the target device 100. As shown in FIG. 2, the base VA and base PA may be available or maintained by the NIC 207. For instance, the target device 100, in particular the NIC 207, may calculate the destination PA 106 based on the offset value 104, according to the following equation:

$$Destination PA = Destination VA - Base VA + Base PA + \text{Offset Value}$$

Thereby, the offset value 104 may be obtained using a second offset address, which, in this example of FIG. 2, is an offset PA, according to the following equation:

$$\text{Offset Value} = <\text{The memory contents at Offset} PA>$$

The offset PA identifies the physical location 208 in the memory 105, at which the offset value 104 is stored, and from which it can be obtained by the NIC 207.

The offset PA may be calculated by the target device 100 based on an offset base VA and an offset base PA of the memory 105 (each known and/or obtained by the target device 100, particularly maintained by the NIC 207), and the destination offset VA 201 according to the following equation:

$$Offset PA = \text{Destination Offset} VA - \text{Offset Base} VA + \text{Offset Base} PA$$

The target device 100 may further, after writing the data 204 using the destination PA 106, initiate an increase of the at least one offset value 104, e.g. modify the current offset value 104 stored in the memory 105, based on the data length 203 of the data 204 according to the following equation:

<The memory contents at Offset$PA$>=Offset Value+ Data Length

That is, the data length 204 is added to the current offset value 104, and the thus obtained new offset value 104 is stored in the physical location 208 in the memory 105.

In some embodiments, the offset value(s) 104 could also be selected by the initiator device 110 (particularly for the "explicit" RDMA Write-with-offset operation shown in FIG. 2), or the offset value(s) 104 may be chosen by the target device 100, for instance, upon arrival of the packet 101. However, the offset value(s) 104 may be located on the target device 100, and may affect the calculation of the second destination address 106 in either way.

The offset value(s) 104 may generally be modified after any RDMA operation, e.g. the offset value(s) 104 may be increased or decreased. As already mentioned above, the offset value(s) 104 may be increased by the size of the incoming data 204 (included in the packet 101, e.g., as indicated by the data length 203), so that a subsequent, identical RDMA Write-with-offset operation (same destination address 102 given in the packet 101, e.g. same destination VA 102) would not overwrite the previously written data 204, but the new data 204 would rather be written right after the previously written data 204 in the memory 105 at a different physical location. In particular, according to the example of FIG. 2 and the previously mentioned equation:

Destination$PA$=Destination$VA$−Base$VA$+Base$PA$+Offset Value if the offset value 104 changes (e.g., is increased by the target device 100), the same destination VA 102 in the next packet 101 will result in a different destination PA 106, i.e. a different physical location 208 in the memory 105 to which the data 204 is written.

Figure 3:
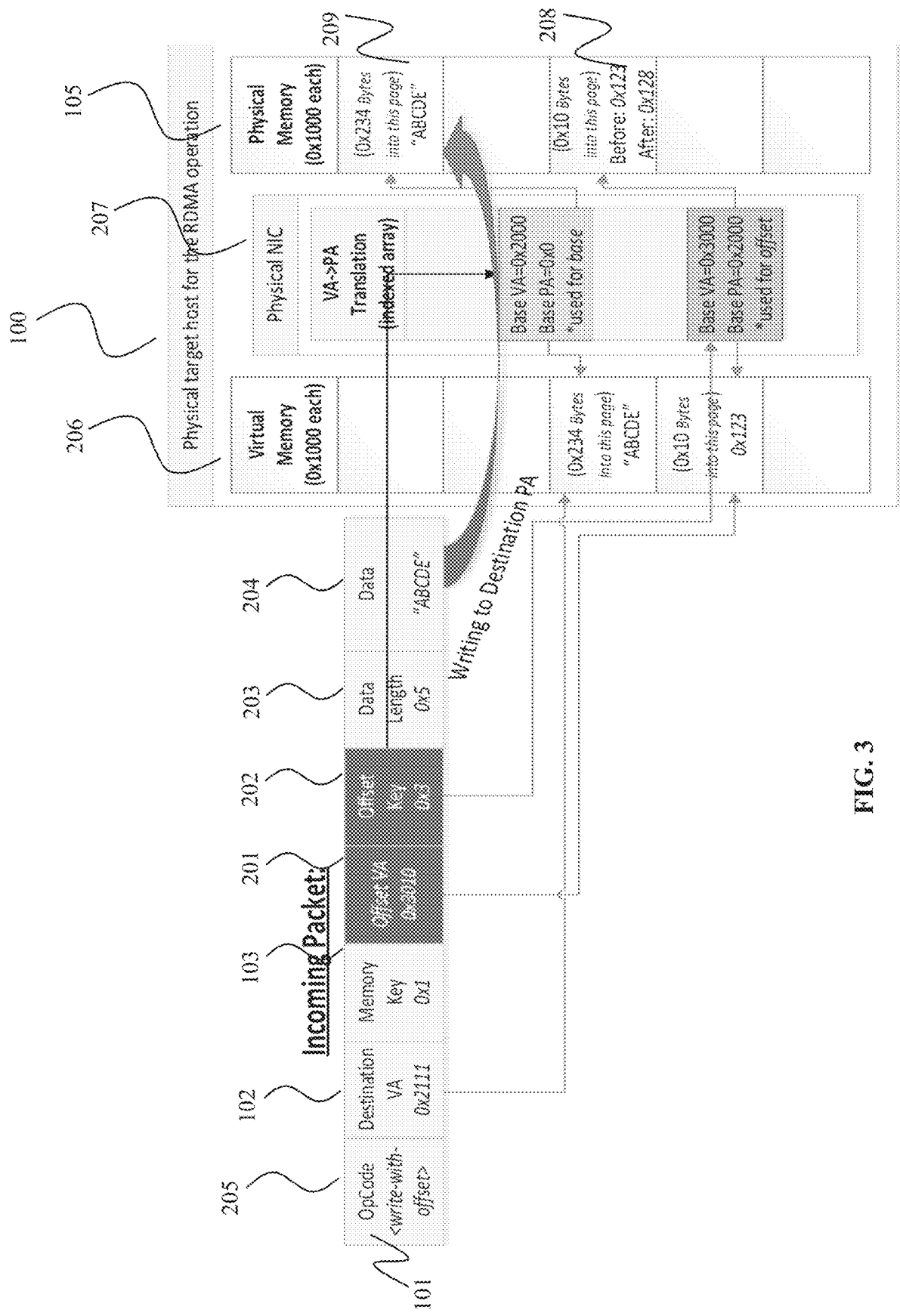
FIG. 3 shows a result of the explicit RDMA Write-with-offset operation.

Thus, the further data 204 may be logically appended to the previously written data 204, when an identical further packet 101 arrives, i.e., the further data 204 included in that identical further packet 101 may be placed right after the previously written data 204 of the previous packet 101, as is shown in FIG. 3.

In particular, FIG. 3 shows an example of an RDMA Write-with-offset operation (see opcode 205), in which the destination VA 102 has a value of 0x2111, the memory key 103 has a value of 0x1, the destination VA 102 has a value of 0x3010, the memory key 202 has a value of 0x3, the data length has a value of 0x5, and the data 204 is "ABCDE". Further, the base VA has a value of 0x2000, the base PA has a value of x, the offset base VA has a value of 0x3000 and the offset base PA has a value of 0x2000. Thereby, the given values are hexadecimal values, wherein 0x denotes the hexadecimal value.

According to the above given equations, the offset PA is thus calculated as being a value of 0x2010 by using the above values (i.e., Offset PA=0x3010−0x3000+0x2000). Notably, the offset VA 201 refers to the virtual memory 206 of the target device 100, and the NIC 207 translates the offset VA 201 into the offset PA. The offset value 104 that can be obtained from the physical location 208 of the memory 105 corresponding to the offset PA has exemplarily a value of 0x123 in FIG. 3.

Based on this offset value 104, the destination PA 106 is calculated as being a value of 0x234 using the above values (i.e., Destination PA=0x2111−0x2000+0x0+0x123).

The data "ABCDE" is then written by the target device 100, particularly the NIC 207, into the physical location 209 in the memory 105 corresponding to the destination PA 106. Thereby, the data 204 may first be written to the buffer of the target device 100 using the destination VA 102, and then from the buffer to the physical location 209 using the destination PA 106.

After the writing of the data 204, the offset value 104 may be increased by the target device 100, particularly the NIC 207, by the length 103 of the data, i.e., by the value of 0x5. Accordingly, the new offset value 104 becomes 0x128 (i.e., new offset value=0x5+0x123).

If now a further packet 101 arrives from the initiator device 110 (with the same destination VA 102), the data 204 of the further packet 101 will not overwrite the previously written data 204, since the (new) offset value 104 is now different, namely has now a value of 0x128 and not anymore of 0x123. In particular, the destination PA 106 for the next RDMA write operation will calculate to: destination PA=0x2111−0x200 W+0x0+0x128. The data 204 of the further packet 101 will thus be logically appended to the previously written data 204. Afterwards, the offset value 104 may again be increased to a value of 0x12D=0x128+0x5 (if the data length 203 of the further data 204 was again 0x5).

The changes (compared to conventional systems and a conventional RDMA Write operation) to the packet 101 and calculation of the second destination address 106, which are described above for the RDMA Write-with-offset operation, can also be applied to the other RDMA operation types. That is, the initiator device 110 and target device 100 may also perform a RDMA Read-with-offset operation, and/or a RDMA Atomic-with-offset operation (not shown in the figures).

Figure 4:
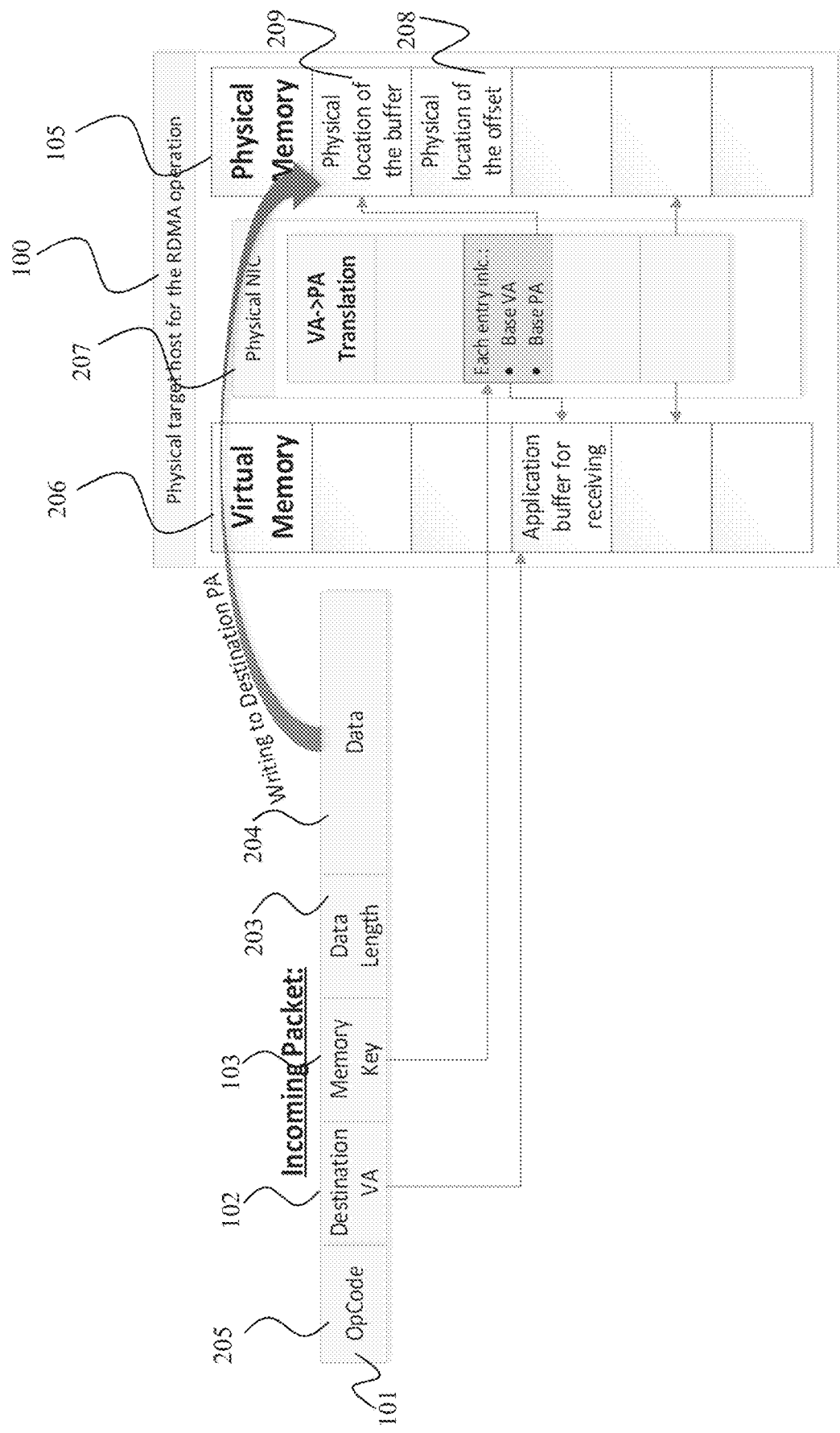
FIG. 4 shows an implicit RDMA write-with-offset operation.

FIG. 4 shows an alternative example to the "explicit" RDMA Write-with-offset operation shown as example in FIG. 2 and FIG. 3. Namely, FIG. 4 shows an "implicit" RDMA Write-with-offset operation. The operation is referred to as "implicit", because the one or more offset values 104 are not indicated by the packet 101, but are implicitly derived by the target device 100. Notably, same elements in FIG. 2 and FIG. 4 share the same reference signs and function likewise.

Figure 6:
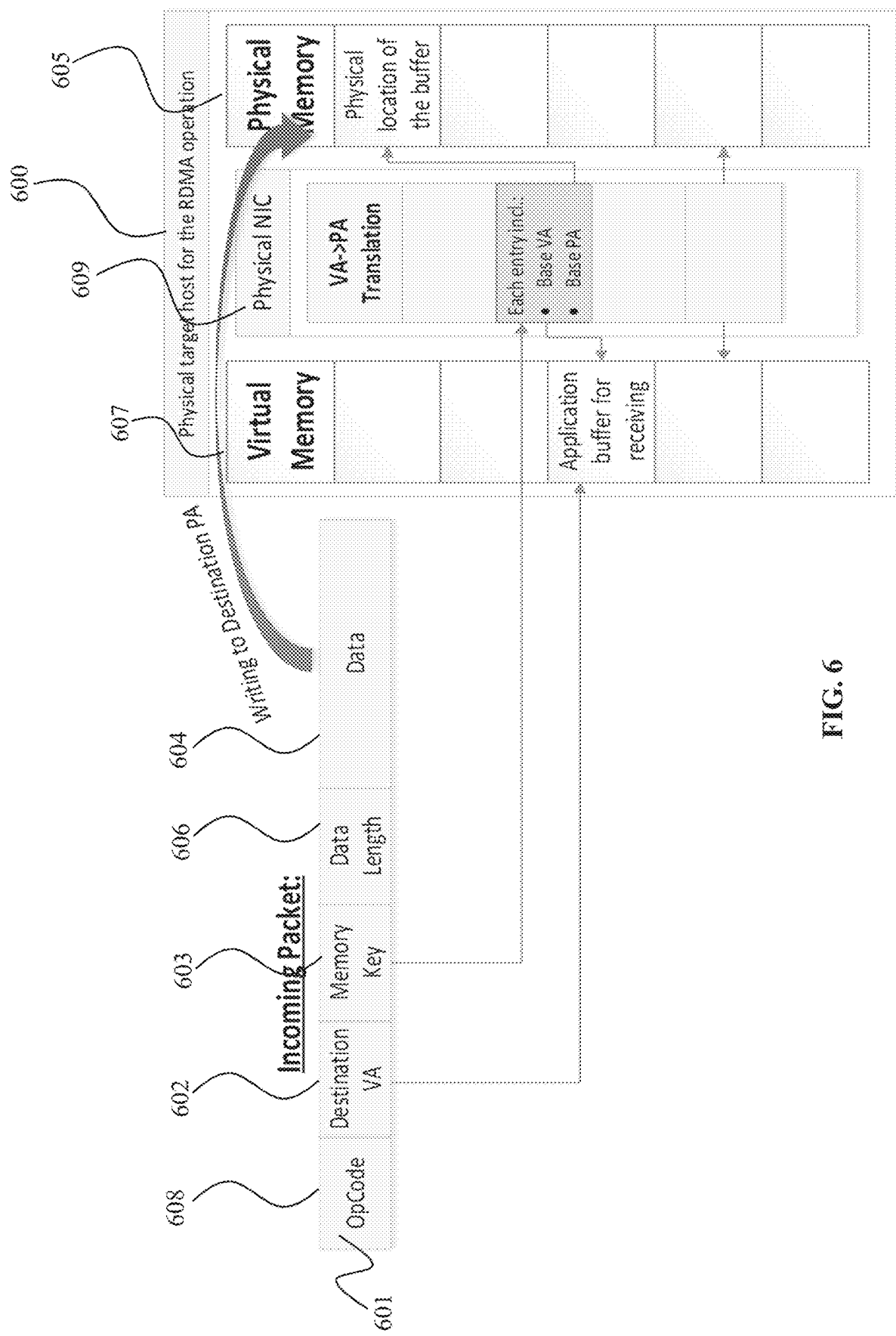
FIG. 6 shows a conventional RDMA Write operation.

In this operation, the packet 101 remains unchanged compared to the packet 601 of the conventional RDMA Write operation, as shown in FIG. 6. That is, the packet 101 includes the opcode 205, the destination VA 102, the memory key 103, the data 204 and the data length 203. However, the packet 101 does not include the destination offset VA 201 and the offset key 202 as the packet 101 shown in FIG. 2. The target device 100 nevertheless uses the offset value 104 when translating the destination VA 102 to the destination PA 106 (in the same manner as described with respect to FIG. 2). The offset value 104 may be controlled by the target device 100 as described for the "explicit" RDMA Write-with-offset operation of FIG. 2. The offset value 104 may, as in the previous "explicit" variant shown in FIG. 2, be stored at the target device 100, e.g., in the memory 105, in particular the physical location 208. The target device 100 obtains the offset value 104 on its own motion, without being given any information in this respect via the packet 101.

The RDMA operations with offset may further be based on the following principles:

Firstly, the NIC 207 of the target device 100 may access the memory 105 directly, thereby not involving the CPU of the target device 100. This so called "CPU offload" saves CPU time, which is accordingly freed to do other things.

Secondly, when sending data 204 of the packet 101 by the initiator device 110, an application may pass instructions directly to the NIC 207 of the target device 100, without involving its operating system (e.g. Linux kernel). This results in considerably less overhead.

Thirdly, in order for the NIC 207 of the target device 100 to access any region of the memory 105, this region may first be "registered" with the NIC 207. The registration informs the NIC 207 of the memory region's VA and PA. These may be the base VA and base PA mentioned above. Typically, the registration also locks this region in place (until it is "deregistered").

Combining the above principles with the RDMA with offset operations enables a scheme, wherein each packet 101 resp. data 204 is passed only once (a) from the region of the initiator device 110 to its NIC (zero-copy send) and (b) from the NIC 207 of the target device 100 to the destination region (zero-copy receive). This significantly reduces the communication latency.

Figure 5:
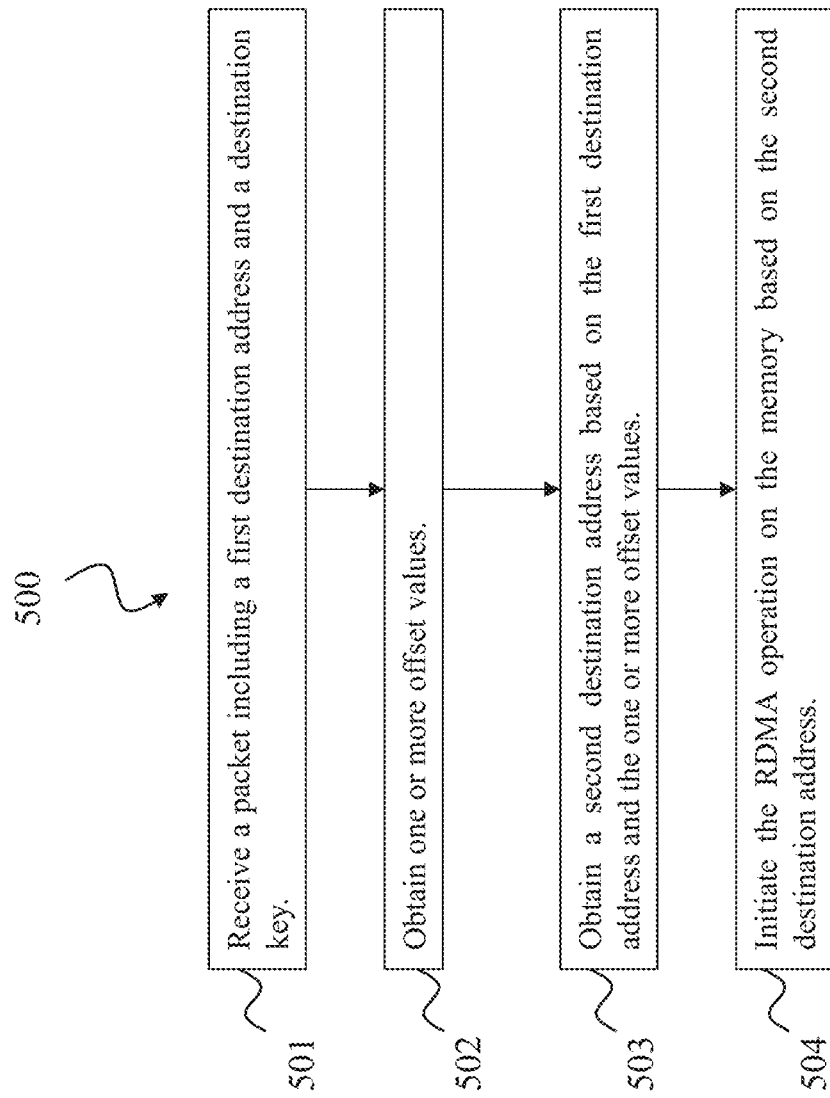
FIG. 5 shows a method for executing an RDMA operation according to an embodiment of the invention.

FIG. 5 shows a method 500 for executing an RDMA operation according to an embodiment of the invention. The method 500 can be performed by the target device 100. For executing an RDMA operation on a memory 105, the method 500 comprises: a step 501 of receiving a packet 101 including a first destination address 102 and a destination key 103; a step 502 of obtaining one or more offset values 104: a step 503 of obtaining a second destination address 106 based on the first destination address 102 and the one or more offset values 104: and a step 504 of initiating the RDMA operation in the memory 105 based on the second destination address 106.

The present invention has been described in conjunction with various embodiments as examples as well as implementations. However, other variations can be understood and effected by those persons skilled in the art and practicing the claimed invention, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

The invention claimed is:

1. A device comprising:
at least one processor; and
one or more memories storing instructions for execution by the at least one processer to:
receive a packet including a virtual address of a virtual memory and a destination key;
obtain one or more offset values;
obtain a physical address of a memory based on the virtual address, the destination key, and the one or more offset values, wherein the destination key includes a memory key that indicates a memory region of the memory where a base physical address is located; and
initiate a remote direct memory access (RDMA) operation in a memory based on the physical address.

2. The device according to claim 1, wherein the packet further comprises one or more first offset addresses and one or more offset keys, and wherein the instructions are for execution by the at least one processor to obtain the one or more offset values based on the one or more first offset addresses and the one or more offset keys.

3. The device according to claim 1, wherein the instructions are for execution by the at least one processor to:

initiate a modification of at least one offset value after the RDMA operation has been executed in the memory.

4. The device according to claim 3, wherein the modification of the at least one offset value comprises an increase or a decrease of the at least one offset value.

5. The device according to claim 3, wherein the packet further comprises a data length, and wherein initiate the modification of the at least one offset value comprises initiating the modification of the at least one offset value based on the data length.

6. The device according to claim 1, wherein the instructions are for execution by the at least one processor to translate the virtual address into the physical address based on a base virtual address, a base physical address of the memory, and the one or more offset values.

7. The device according to claim 2, wherein the instructions are for execution by the at least one processor to:
obtain one or more second offset addresses based on the one or more first offset addresses; and
obtain the one or more offset values based on the one or more second offset addresses.

8. The device according to claim 7, wherein the one or more first offset addresses are virtual addresses of a virtual memory of the device, wherein the one or more second offset addresses are physical addresses of the memory, and wherein the instructions are for execution by the at least one processor to translate the one or more first offset addresses into the one or more second offset addresses based on one or more offset base virtual addresses and an offset base physical address of the memory.

9. The device according to claim 8, wherein the instructions are for execution by the at least one processor to obtain the one or more offset base virtual addresses and the offset base physical address based on the one or more offset keys.

10. The device according to claim 1, wherein the instructions are for execution by the at least one processor to store the one or more offset values in the device or the memory, and wherein the memory is comprised in the one or more memories or a remote memory communicably coupled to the device.

11. A device comprising:
at least one processor; and
one or more memories storing instructions for execution by the at least one processer to:
provide, to another device, a packet including a destination address, a destination key, one or more offset addresses, and one or more offset keys, wherein the destination address indicates a location for a remote direct memory access (RDMA) operation in a remote memory, wherein the destination key includes a memory key that indicates a memory region of the memory where a base physical address is located, and wherein the one or more offset addresses indicate a location of one or more offset values stored in the another device or the remote memory.

12. The device according to claim 11, wherein the RDMA operation is an RDMA write operation, an RDMA read operation, or an RDMA atomic operation.

13. A method for executing a remote direct memory access (RDMA) operation comprising:
receiving a packet including a virtual address of a virtual memory and a destination key;
obtaining one or more offset values;
obtaining a physical address of a memory based on the virtual address and the one or more offset values, wherein the destination key includes a memory key that indicates a memory region of the memory where a base physical address is located; and initiating the RDMA operation in a memory based on the physical address.

14. The method according to claim 13, wherein the packet further comprises one or more first offset addresses and one or more offset keys, and the method further comprises obtaining the one or more offset values based on the one or more first offset addresses and the one or more offset keys.

15. The method according to claim 13, further comprising:

initiating a modification of at least one offset value after the RDMA operation has been executed in the memory.

16. The method according to claim 15, wherein the packet further comprises a data length, and wherein initiating the modification of the at least one offset value comprises initiating the modification of the at least one offset value based on the data length.

17. The method according to claim 13, wherein the method further comprises translating the virtual address into the physical address based on a base virtual address, a base physical address of the memory, and the one or more offset values.

18. The method according to claim 14, further comprising:

obtaining one or more second offset addresses based on the one or more first offset addresses; and obtaining the one or more offset values based on the one or more second offset addresses.

19. The method according to claim 18, wherein the one or more first offset addresses are virtual addresses of a virtual memory of a device, wherein the one or more second offset addresses are physical addresses of the memory, and wherein the method further comprising translating the one or more first offset addresses into the one or more second offset addresses based on one or more offset base virtual addresses and an offset base physical address of the memory.

20. A method for initiating a remote direct memory access (RDMA) operation in a remote memory, the method comprising:

providing a packet including a destination address, a destination key, one or more offset addresses, and one or more offset keys, wherein the destination address indicates a location for the RDMA operation in the remote memory, wherein the destination key includes a memory key that indicates a memory region of the memory where a base physical address is located, and wherein the one or more offset addresses indicate a location of one or more offset values stored in a device that maintains the one or more offset values or in the remote memory.

* * * * *